United States Patent
Ruech et al.

(10) Patent No.: US 10,576,836 B2
(45) Date of Patent: Mar. 3, 2020

(54) BATTERY CARRIER FRAME AND METHOD FOR THE PRODUCTION THEREOF

(71) Applicant: Dura Automotive Holdings U.K., Ltd, Birmingham (GB)

(72) Inventors: Carsten Ruech, Spay (DE); Christian Schulte, Lennestadt (DE); Holger Rau, Reichshof (DE)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 16/010,763

(22) Filed: Jun. 18, 2018

(65) Prior Publication Data

US 2018/0361875 A1    Dec. 20, 2018

(30) Foreign Application Priority Data

Jun. 19, 2017 (EP) .................................... 17176646

(51) Int. Cl.
| | |
|---|---|
| *B60K 1/04* | (2019.01) |
| *B60L 11/18* | (2006.01) |
| *B60L 50/64* | (2019.01) |
| *H01M 2/10* | (2006.01) |
| *B23K 31/02* | (2006.01) |
| *B23K 101/36* | (2006.01) |
| *B23K 101/24* | (2006.01) |
| *B23K 103/10* | (2006.01) |

(52) U.S. Cl.
CPC .......... *B60L 11/1879* (2013.01); *B23K 31/02* (2013.01); *B60K 1/04* (2013.01); *B60L 50/64* (2019.02); *H01M 2/1072* (2013.01); *B23K 2101/24* (2018.08); *B23K 2101/36* (2018.08); *B23K 2103/10* (2018.08)

(58) Field of Classification Search
CPC ...... B60L 11/1879; B60L 50/64; B23K 31/02; B23K 2101/24; B23K 2101/36; B23K 2103/10; B29C 65/00; B60K 1/04; F16B 7/00; H01M 2/1072
See application file for complete search history.

(56) References Cited

U.S. PATENT DOCUMENTS

| | | | |
|---|---|---|---|
| 3,494,609 A | 2/1970 | Harbers, Jr. | |
| 4,024,691 A | 5/1977 | Hansen et al. | |
| 2015/0171385 A1* | 6/2015 | Juventin | ............. H01M 2/1022 429/99 |

FOREIGN PATENT DOCUMENTS

| | | |
|---|---|---|
| DE | 102013015299 A1 | 3/2015 |
| WO | 2015032495 A2 | 3/2015 |

\* cited by examiner

*Primary Examiner* — Bryan A Evans

(57) ABSTRACT

In order to optimize a support frame for an electric vehicle battery in terms of tightness, compensation of component tolerances and load absorption in particular in the event of a crash, and to ensure good automated weldability, provision is made for a compensation insert to be arranged as tolerance compensation between a longitudinal profile and a transverse profile.

14 Claims, 3 Drawing Sheets

BATTERY CARRIER FRAME AND METHOD FOR THE PRODUCTION THEREOF

TECHNICAL FIELD

Figure 1A:
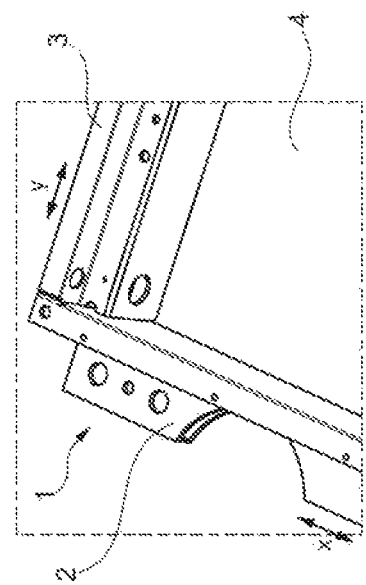

The invention relates to a support frame for an electric vehicle battery, which is designed in particular for use in electrically driven passenger cars.

BACKGROUND

In the context of this application, the term "battery" is used as a synonym for the entirety of an electrical energy store accommodated in a support frame, and therefore also obviously includes rechargeable batteries and an arrangement of a plurality of individual cells. The term "electric vehicle" includes in particular an electromotively driven passenger car and relates both to fully electrically driven cars and hybrid cars, i.e. ones which have a drive in which, depending on the drive concept and operating state, an electric motor and combustion engine are used jointly or alone to provide the drive energy.

Electric vehicles with a fully electric or at least partially electric or hybrid drive require—depending on the drive concept—the accommodation of batteries with a weight of up to several hundred kilograms. For the accommodation of the batteries in the vehicle, a number of aspects need to be taken into consideration.

The batteries should be arranged in a support structure that is sealed towards the outside, such that any leakage of a battery does not result in liquid or other substances escaping from the battery being able to pass into the environment. In terms of production, this demands that the support structure should form an at least downwardly sealed tray which prevents any escape of liquids under gravity in the event of damage (battery housing defect, accident, etc.). In addition, the support structure should be sealed from the outside to the inside, for instance in order to prevent moisture and/or dirt from being able to pass from the outside into the interior of the battery carrier frame, which could in turn increase the risk of short-circuits or other functional impairments.

On account of the size of the batteries of modern electric vehicles, the support structures used for the batteries are increasingly also taking on structural tasks within the vehicle body. Therefore, a construction of a support structure accommodating the battery should take account not only of the forces that arise during driving and the interaction of the support structure with the rest of the body, but also in particular the loads that arise in the event of a crash.

Both of the above-mentioned demands mean that the connection of the structural components from which the support structure accommodating the battery is constructed has to be sufficiently leak tight and stable. However, the metal profiles that are preferably used to produce the support structure have—not least on account of employed profile lengths of sometimes much more than one meter—dimensional deviations at the connecting points that are preferably to be joined in a cohesive manner (typically in the corner region of a frame), in particular twists which result in gaps or misalignment of the components to be connected in an order of magnitude, which, in particular in automated welding processes, but also during adhesive bonding operations and other cohesive connecting techniques, can cause problems in terms of strength and tightness of the connection and in process control and automation.

Therefore, it is desirable to provide a support frame for an electric vehicle battery, which is optimized in terms of tightness, compensation of component tolerances and load absorption in particular in the event of a crash, and can be welded readily in an automated manner. It is further desirable to provide a method for producing such a support frame.

SUMMARY

According to several aspects, a battery support frame for an electric vehicle is provided, having a longitudinal profile and having a transverse profile, wherein the support frame has a support frame corner forming an internal angle. A compensation insert is arranged as tolerance compensation between the longitudinal profile and transverse profile, the longitudinal profile and transverse profile being connected together with said compensation insert being incorporated.

In order to produce such a battery support frame, the following method steps are provided: positioning the compensation insert in the region of the support frame corner in a balancing position in which, with a deviation in nominal dimension that exists between the profiles being balanced out, the compensation insert is placed against a side face of the longitudinal profile or against a side face of the transverse profile and is pushed into or onto the end side of the respectively other profile, and connecting the longitudinal profile and the transverse profile to the compensation insert.

The connection of the longitudinal profile and of the transverse profile to the compensation insert takes place preferably via a cohesive connection, in particular a welded joint or an adhesive bond. The compensation insert serves as a tolerance compensating bridging plug-in unit and is preferably a (die-)cast part, a deep drawn part or a forged part and is further preferably produced from a light metal alloy, in particular an aluminum alloy, and preferably as a solid material component. The longitudinal profile and transverse profile are preferably extruded profiles made of light metal alloys, in particular aluminum alloys. Preferably, the longitudinal profile and/or transverse profile are multi-chamber hollow profiles with one or more internal webs. Of course, it is also possible for the longitudinal profile and/or transverse profile and/or corner profile to be produced from an optionally fiber reinforced plastic material. In particular in such a case, provision can also be made for the different components to be joined by adhesive bonding.

As a result of the use of a compensation insert additionally inserted in the region of the support frame corner, said compensation insert being an originally separate component from the longitudinal profile and the transverse profile and being used to avoid the need to connect the transverse profile and longitudinal profile directly together, any dimensional deviations of the carrier profiles from the ideal nominal dimension, in particular twists or profile torsions, and other misalignments of the component regions influencing the weld joint, can be compensated and balanced out via the compensation insert. It is also possible for other deviations in nominal dimension, such as deviations from straightness, for instance, to be balanced out.

A further advantage is that the preferably peripheral weld seams to be realized to connect the longitudinal and transverse profiles, or the adhesive bonds are either transposed out of the immediate corner region to a more easily reachable location or—and this goes for the weld seam or adhesive bond via which the compensation insert is connected to a side face of one profile—can be realized without the physical presence of the other profile. Therefore, the connection between the components, in particular the welds or adhesive bonds, can be carried out more reliably with a better result in terms of load bearing capacity and tightness.

As a result of the use of a compensation insert and the incorporation thereof into the cohesive connection between the transverse profile and longitudinal profile, more highly loadable weld seams arise with little production related welding effort, said weld seams also satisfying the tightness demands made of the battery support frames with greater reliability. Both the connection of the longitudinal profile to the compensation insert and the connection of the transverse profile to the compensation insert can be formed by a peripheral weld seam located in a welding plane.

In order for it to be possible to implement the above described advantages particularly readily, provision is made for the compensation insert to overlap the inside or outside of the end side peripheral region of the longitudinal profile or of the transverse profile and to be connected to the respectively other profile via an external side face thereof. In this way, the longitudinal profile and transverse profile are not connected directly together, but rather the connection of the two profiles is ensured via the compensation insert.

It is considered to be advantageous when the compensation insert penetrates into the end side of the longitudinal profile or of the transverse profile and an external dimension of the compensation insert is undersized with respect to the profile into which the compensation insert penetrates, or when the compensation insert engages externally over the end side of the longitudinal profile or of the transverse profile and an internal dimension of the compensation insert is oversized with respect to the profile over which the compensation insert engages externally. This makes it possible to twist the longitudinal or transverse profile, in spite of the engagement of the compensation profile in the respective profile, with respect to the compensation insert at least to an extent that is required for tolerance compensation. "Undersized" and "oversized" mean in this case the deliberate establishment of a generous interference fit or of a clearance, such that any deviation from the nominal dimension can be compensated.

In this way, an outer side face of the longitudinal member can for example be butted against the compensation insert in order to be connected to the compensation insert and can subsequently be connected to the compensation insert, and/or an outer side face of the transverse member can be butted against the compensation insert in order to be connected to the compensation insert, and subsequently connected thereto. The placement of the compensation insert against a side face of the longitudinal profile or of the transverse profile takes place in a balancing position, preferably with any deviation in nominal dimension already being taken into consideration.

Provision can be made for the compensation insert to penetrate into the end side of the longitudinal profile or of the transverse profile, and for the longitudinal profile or the transverse profile into which the compensation insert penetrates to have internal webs extending internally from a wall forming the profile outer face, said internal webs being removed in the region in which the compensation insert penetrates into the profile. This ensures that the compensation insert can come into contact with the internal webs in a formfitting manner on the inner side of the profile into which it penetrates, upon deformation thereof or failure of the connection. Thus, in addition to the weld seams connecting the compensation insert and the longitudinal or transverse profile, a load path acting in a formfitting manner in the longitudinal direction of the profile into which the compensation insert penetrates is also ensured, said load path acting in particular when, in the event of a crash, the weld seam fails or the profile is highly deformed on account of buckling.

Preferably, the compensation insert is formed in a tray-like manner and can in particular have a peripherally closed side wall formed preferably by a peripheral web, said side wall penetrating partially into the end side of the transverse profile or of the longitudinal profile. During the production of the battery support frame, the longitudinal profile and the transverse profile can then be connected together via the compensation insert in order to form the support frame corner. In this case, the longitudinal profile and/or the transverse profile is preferably connected to the compensation insert via a peripheral weld seam, after the compensation insert has been placed against a side face of the longitudinal profile in a balancing position that takes the deviation in nominal dimension into consideration. Subsequently, the respectively other profile is connected to the compensation insert via a peripheral weld seam. Given sufficient proximity of the transverse profile and the longitudinal profile, it is also possible for a single weld seam to be provided, however, which connects the longitudinal profile and transverse profile cohesively together, with the material of the compensation insert being incorporated.

As a result of the use of the compensation insert between the longitudinal profile and transverse profile, misalignment of the profiles with respect to one another can be compensated with a simultaneous increase in load bearing capacity and tightness of the support frame corner. As a result of the compensation insert, in particular any transmission of a deviation in nominal dimension, present in the region of the support frame corner, of one of the two profiles to be connected to the other profile is also avoided. The spacing that the end side of one profile, into which the compensation insert penetrates to a particular penetration depth, takes up with respect to the side face of the other profile, to which the compensation insert is connected, is additionally variable on account of the fact that the system allows different penetration depths.

In order to produce not only tightness of the support frame corner at the connecting points between the compensation insert and longitudinal or transverse profile, but also tightness of the support frame with respect to a base plate, provision can be made for at least that region of the support frame corner that is formed by the compensation insert, the longitudinal profile and the transverse profile to be finish machined on its underside after the longitudinal profile and transverse profile have been connected to the compensation insert. In this way, in particular a planar base plate can be connected to the support frame with a precise fit. Any remaining misalignments or weld-seam protuberances that can have a disadvantageous effect on the tightness and load bearing capacity in the production of the connection of base plate and support frame, in particular in the region of the support frame corner, are eliminated reliably in this way.

The above described battery support frame and the method for the production thereof allow a configuration of a battery support frame in which the longitudinal profile and the transverse profile are hollow chamber profiles, wherein the outwardly directed profile side of one of the two profiles and the inwardly directed profile side of the other of the two profiles can be the sealing profile side, while openings or bores can be provided in the respectively other profile side.

Further features and advantages of the invention will become apparent from the following description of preferred exemplary embodiments with reference to the drawings.

DRAWINGS

Figure 2A:
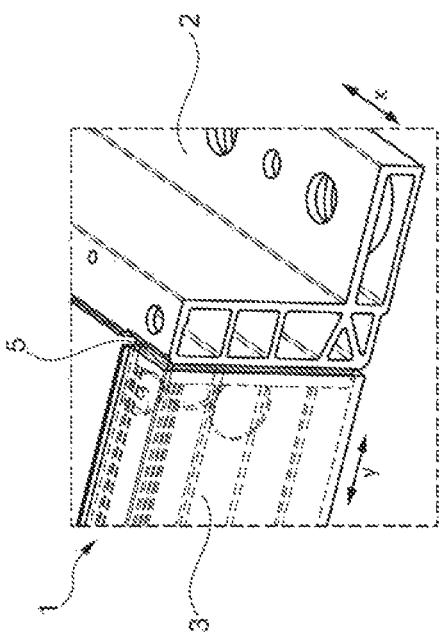
Figure 3:
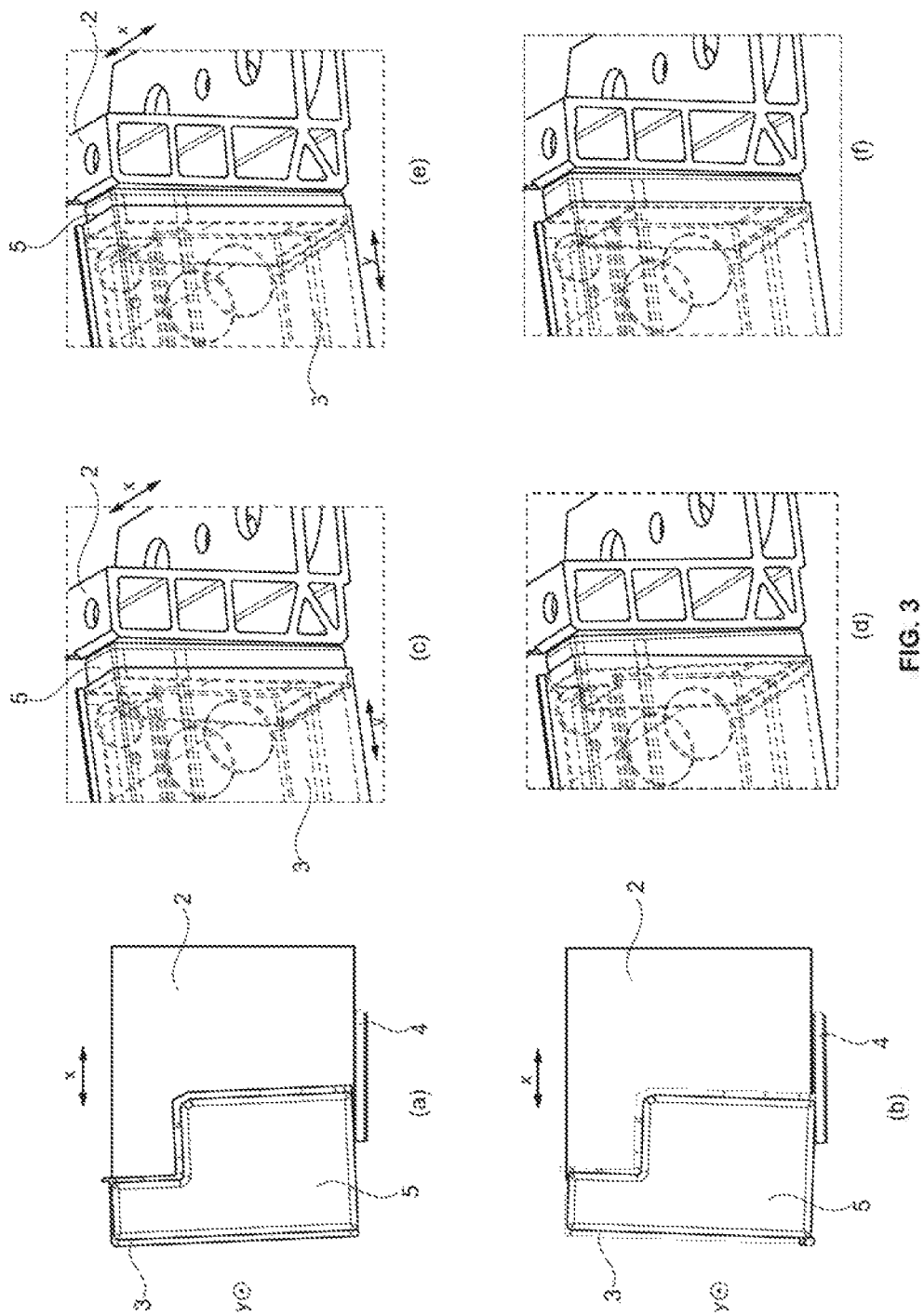
Figure 5:
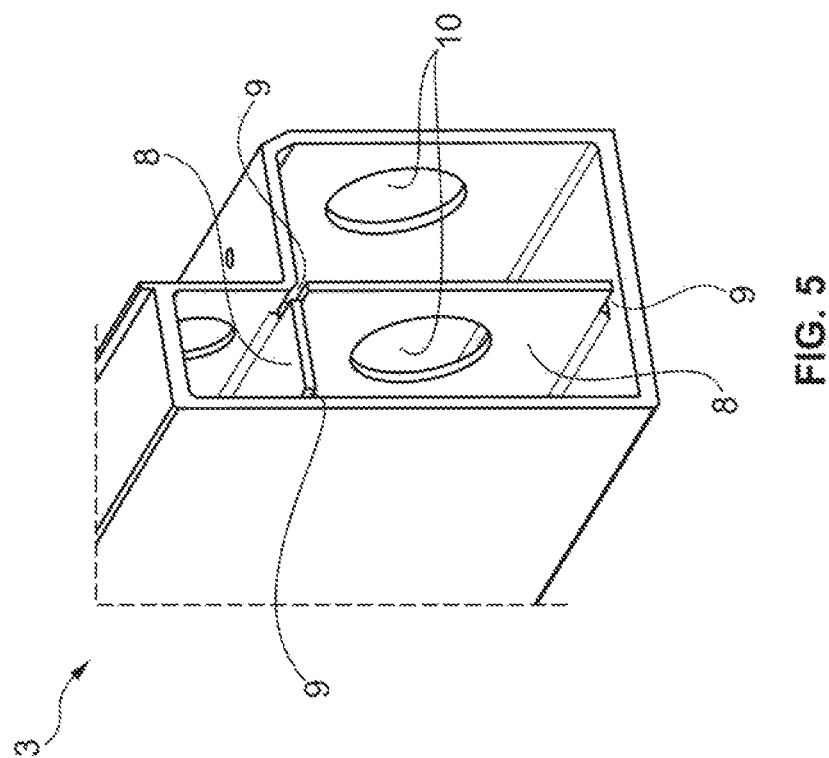
Figure 4:
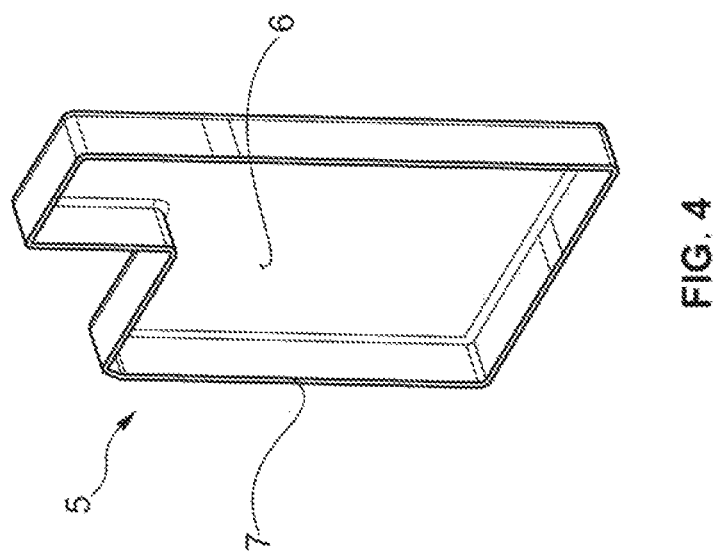

In the drawings:

FIG. 1a/1b show the corner region of a conventional support frame for an electric vehicle battery in two different perspective views, FIG. 2a/2b show the corner region of a support frame for an electric vehicle battery, having a compensation insert inserted into the region of the support frame corner, in two different perspective views, FIG. 3 shows a comparison of different tolerance compensations that are realizable by the compensation insert, FIG. 4 shows a detail view of the compensation insert, FIG. 5 shows a view of a longitudinal or transverse profile cross section with partially removed internal webs.

DETAILED DESCRIPTION

Figure 1B:
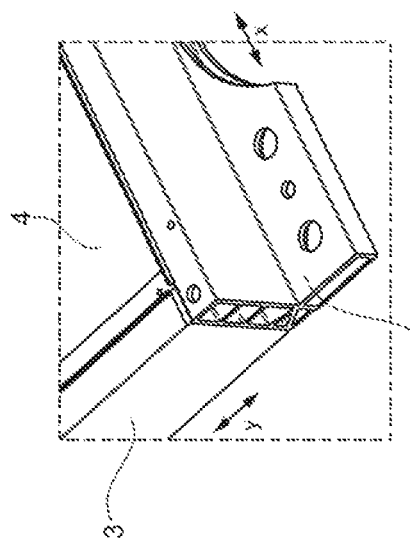

FIG. 1a and FIG. 1b show a corner region of a conventional battery support frame 1. A longitudinal profile 2 oriented with its longitudinal extent in the x direction (parallel to the direction of forward travel when driving straight ahead) is connected to a transverse profile 3 which extends in the y direction (transversely to the x direction and parallel to the road surface). The battery support frame 1, which is not fully illustrated in the figures, has at least two or a total of up to four corners configured in such a way and is preferably formed in a rectangular manner. On the underside of the longitudinal profile 2 and transverse profile 3, a base plate 4 is fastened to the frame.

The longitudinal profile 2 and transverse profile 3 are welded. The weld seam, which is not explicitly apparent from the figures, extends, over a major part of its periphery, along an inner side face of the longitudinal profile 2 and, on account of the fact that an end side of the transverse profile 3 is butted against the side face, serving as a connecting face, of the longitudinal profile, is embodied as a fillet weld in this region. The weld seam extends along the internal corner that arises immediately at the butt joint between the transverse profile and longitudinal profile.

In this construction, insufficient dimensional accuracy of the longitudinal profile 2 and/or of the transverse profile 3 has the result that, in the region of the connecting point that also forms the internal corner of the frame, irregular gaps form, which are not readily correctable but ultimately have to be bridged by the weld seam. In particular, the longitudinal profile can be inherently twisted by a longitudinal profile torsion. Such gaps result in turn in a much greater risk of insufficiently solid and leak tight weld seams and make reliable automated welding more difficult.

Figure 2B:
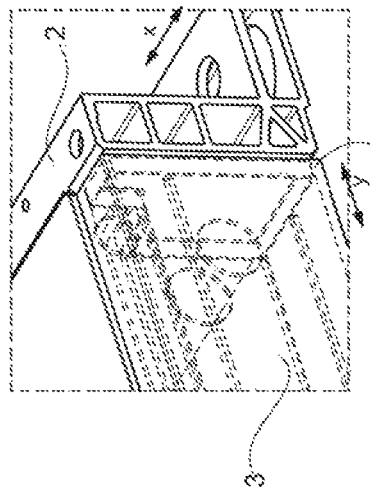

In order to remedy the above described problems, the battery support frame 1 according to FIGS. 2a and 2b provides, between the longitudinal profile 2 and transverse profile 3, a compensation insert 5 bridging the support frame corner. The profiles 2, 3 that are still connected by means of a single peripheral weld seam according to FIG. 1a and FIG. 1b can now be connected by means of two separate or overlapping weld seams of via a wider weld seam, which also covers the compensation profile 5 and does not connect just the two profiles 2, 3 directly together. The guarantee that the welds are sufficiently loadable and leak tight is increased considerably by the incorporation of the compensation insert into the weld joint and by the balancing out, ensured thereby, of any deviations in nominal dimension.

In the case of the battery support frame 1 shown in FIG. 2a and FIG. 2b, too, a base plate 4 is connected to the support frame, said base plate being indicated on the underside of the support frame corner in depictions (a) and (b) of FIG. 3.

Depictions (a) to (f) of FIG. 3 illustrate different possible ways of balancing out deviations in nominal dimension allowed by the use of a compensation insert.

Depictions (a) and (b) illustrate different orientations of the compensation insert 5 in a viewing direction in the y direction towards the side faces of the longitudinal profile 2. As can be seen, the compensation insert in depiction (a) is tilted slightly in an anti-clockwise direction with respect to the x direction as a result of a profile torsion of the transverse profile 3, while in depiction (b) the compensation insert is tilted slightly in a clockwise direction with respect to the x direction as a result of a profile torsion of the transverse profile 3. Thus, depictions (a) and (b) of FIG. 3 indicate in particular the balancing out of a transverse member profile torsion with respect to the longitudinal profile.

Depictions (c) and (d) of FIG. 3 reveal the balancing out of a longitudinal profile torsion with respect to the transverse profile (3). As can be seen, in depiction (c), the lower periphery of the compensation insert 5 passes more deeply into the end side of the transverse profile 3 than the upper periphery. Deviating from the nominal dimension, the longitudinal profile 2 is inherently twisted such that the end side cross section is tilted slightly in a clockwise direction with respect to the transverse profile 3. In depiction (d), it is precisely the reverse. In this case, the upper periphery of the compensation insert 5 passes more deeply into the transverse profile 3. As a result of a present profile torsion, the longitudinal profile 2 is inherently twisted such that the end side cross section of the longitudinal profile 2 is tilted slightly in an anticlockwise direction with respect to the transverse profile 3. In both cases, the compensation profile takes up the profile torsion of the longitudinal profile 2 and balances it out with respect to the transverse profile 3.

Depictions (e) and (f) illustrate that, as a result of the compensation insert 5 being able to penetrate to different depths into the transverse profile 3, it is also possible for a length deviation of the transverse profile 3 from the nominal length and/or a deviation in straightness in the longitudinal profile 3 to be balanced out via the compensation insert.

FIG. 3 illustrates that the compensation insert 5 is configured in an undersized manner with respect to the internal dimension of the profile into which it is introduced, such that the compensation insert 5 can balance out the different deviations from the theoretical nominal dimensions of the profiles. Of course, the compensation insert is also capable of balancing out other deviations in nominal dimension than the ones explicitly illustrated in FIG. 3.

FIG. 4 shows the compensation insert 5 in a perspective view. The compensation insert 5 has a tray-like structure with an underside abutment face 6 which, in the exemplary embodiment shown in the figures, is placed against the side face of the longitudinal profile. The compensation insert 5 has an encircling peripheral web 7 which is dimensioned such that the compensation insert 5 can be introduced with a leading peripheral web 7 into an open end at the end of the transverse profile. The outwardly directed face of the peripheral web 7 forms the connecting face via which the compensation insert 5 is also incorporated into the connection of transverse profile and longitudinal profile by cohesive connection to the longitudinal profile and the transverse profile.

The abutment face 6 can, as illustrated in the figures, be completely closed. However, it is also possible for the abutment face 6 not to form a closed face. For example, the respective peripheral region of the compensation insert can be formed by a peripheral limb with an angled profile that forms the peripheral web 7 and passes into the transverse profile when used as intended, and a preferably inwardly directed limb that defines the abutment face with its underside.

FIG. 5 shows a transverse profile 3 into which the compensation insert 5 shown in FIG. 4 can pass. In order to allow this, notches 9 are provided in internal webs 8 exhibited by the transverse profile 3 configured as a multi-chamber hollow profile, said notches 9 allowing the compensation insert 5 to pass in in the longitudinal direction of the transverse profile. At the same time, the internal webs 8 ensure that, in the event of an accident, in particular in the event of a side impact and associated buckling related deformation and/or a possible failure of a weld seam connecting the longitudinal profile and transverse profile, the compensation insert 5 comes into formfitting abutment with the internal webs of the transverse profile and any forces are also supported via the internal webs with the compensation insert being incorporated into the load path. The compensation insert engaging in the transverse profile 3 is capable of forming an engagement, acting in a formfitting manner, with the transverse profile in the x direction, too.

In order to avoid a situation during the production of the battery support frame in which, for example, a longitudinal profile torsion is transmitted to the transverse profile via the compensation insert when first the longitudinal profile and compensation insert are connected together and then the transverse profile is connected to the compensation insert, the transverse profile and longitudinal profile are positioned and oriented in a nominal position with respect to one another and the compensation insert is urged into a balancing position, in which it is set with the lower abutment face against the side face of the longitudinal profile, with any deviations in nominal dimension of the longitudinal profile and transverse profile being balanced out (cf. FIG. 3). In order to be transferred into the balancing position, a setting force can be exerted on the compensation insert. To this end, the transverse profile could be engaged in for example via engagement openings 10 and the compensation insert could be transferred into the balancing position by means of an adjusting cam. It would also be conceivable to increase the internal pressure in the transverse profile, for instance by air injection, such that the compensation insert is urged into the balancing position as a result of the internal pressure.

Insofar as the production of the battery support frame has been described above in particular with regard to a longitudinal profile torsion and to the effect that the compensation insert is placed against a side face of the longitudinal profile and passes into the end side of the transverse profile or engages over the latter, it should be noted that this arrangement can of course also be reversed depending on the particular application case. In particular, it should be noted that a profile torsion can of course equally be present in the transverse profile.

LIST OF REFERENCE SIGNS

1 Battery support frame
2 Longitudinal profile
3 Transverse profile
4 Base plate
5 Compensation insert
6 Abutment face
7 Peripheral web
8 Internal webs
9 Notches
10 Engagement openings The following is claimed:

1. A battery support frame for an electric vehicle, the battery support frame comprising:
 a longitudinal profile and a transverse profile connected to one another to form at least one support frame corner defining an internal angle; and
 a compensation insert arranged as tolerance compensation between the longitudinal profile and the transverse profile, wherein the compensation insert is configured to compensate for the tolerance associated with the connection between the longitudinal profile and the transverse profile.

2. The battery support frame according to claim 1, wherein the compensation insert overlaps the inside or outside of the end side peripheral region of the longitudinal profile or of the transverse profile and is connected to the respectively other profile via a side face thereof.

3. The battery support frame according to claim 1, wherein the compensation insert penetrates into the end side of the longitudinal profile or of the transverse profile and an external dimension of the compensation insert is undersized with respect to the profile into which the compensation insert penetrates, or in that the compensation insert engages externally over the end side of the longitudinal profile or of the transverse profile and an internal dimension of the compensation insert is oversized with respect to the profile over which the compensation insert engages externally.

4. The battery support frame according to claim 1, wherein the compensation insert penetrates into the end side of the longitudinal profile or of the transverse profile, and the longitudinal profile or the transverse profile into which the compensation insert penetrates has internal webs extending internally from a wall forming the profile outer face, said internal webs being removed in the region in which the compensation insert penetrates into the profile.

5. The battery support frame according to claim 1, wherein the compensation insert is formed in a tray-like manner.

6. The battery support frame according to claim 1, wherein the compensation insert has a peripherally closed side wall, which penetrates partially into the transverse profile or the longitudinal profile or engages over the latter in an overlapping manner.

7. The battery support frame according to claim 1, wherein the longitudinal profile and the transverse profile are connected cohesively together, incorporating the compensation insert.

8. The battery support frame according to claim 1, wherein the longitudinal profile is connected to the compensation insert via a peripheral weld seam, and the transverse profile is connected to the compensation insert via a peripheral weld seam.

9. The battery support frame according to claim 1, wherein a region of the at least one support frame corner that is formed by the compensation insert, the longitudinal profile and the transverse profile is finish machined on its underside after the longitudinal profile and transverse profile have been connected to the compensation insert.

10. The battery support frame according to claim 1, wherein the longitudinal profile and the transverse profile are hollow chamber profiles, wherein the outwardly directed profile side of one of the two profiles and the inwardly directed profile side of the other of the two profiles is the profile side that seals the support frame towards the outside.

11. A method for producing a battery support frame, wherein the battery support frame includes a longitudinal profile, a transverse profile, and a support frame corner, the method comprising:

positioning a compensation insert in a region of the support frame corner in a balancing position in which, with a deviation in nominal dimension that exists between the profiles being balanced out, wherein the compensation insert is placed against a side face of the longitudinal profile or against a side face of the transverse profile and is pushed into or onto the end side of the respectively other profile, wherein the compensation insert compensates for the deviation between the profiles; and connecting the longitudinal profile and the transverse profile to the compensation insert.

12. The method of claim 11 further comprising finish machining an underside region, formed by the compensation insert, the longitudinal profile and the transverse profile, of the at least one support frame corner after the longitudinal profile and the transverse profile have been connected.

13. The method of claim 11 wherein the compensation insert is transferred by an adjusting force applied thereto into the balancing position balancing out an existing deviation in nominal dimension.

14. The method of claim 11 wherein before the compensation profile is pushed into the transverse profile or longitudinal profile, internal webs within the transverse profile or the longitudinal profile have been trimmed.

* * * * *